Figure 1:
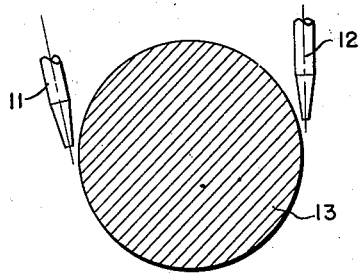

April 25, 1944.  J. L. ANDERSON  2,347,245

METHOD OF CUTTING

Original Filed Jan. 25, 1940

INVENTOR
JAMES L. ANDERSON

BY
ATTORNEY

Patented Apr. 25, 1944

2,347,245

UNITED STATES PATENT OFFICE 2,347,245

METHOD OF CUTTING

James L. Anderson, Closter, N. J., assignor to Air Reduction Company, Incorporated, New York, N. Y., a corporation of New York Original application January 25, 1940, Serial No. 315,473. Divided and this application October 25, 1941, Serial No. 416,446

4 Claims. (Cl. 148—9)

This invention relates to the cutting of metal bodies by means of oxygen jets directed against the work-pieces from cutting torches.

An object of the invention is to cut faster without using excessive quantities of oxygen. Attempts to increase cutting speed by using larger tips and higher oxygen pressures waste oxygen, and beyond rather narrow limits are ineffective. With this invention a cut is made by using two cutting torches that are moved across the work-piece from opposite sides, with the torches disposed to cut in the same plane.

By making different parts of a cut at the same time the period required to sever a work-piece can be almost cut in half. Because of the necessary physical dimensions of the torches, or their supports, however, one cut is stopped before the torches come together and the stopped torch is moved back out of the way while the other torch completes the cut.

When cutting thick work-pieces the torches moving toward one another are set to project their oxygen jets in directions that converge at an angle that is approximately equal to the sum of the drag angles of the cuts made by the torches. This feature of having one torch in effect undercut the drag of the cut made by the other makes practical the use of two torches on a single cut. It may be said, therefore, to be another object of the invention to provide an improved cutting process in which two torches are used to make a single cut.

Another feature of the invention relates to variation in the speed of the torches to compensate for changes in the thickness of the work-piece, and in the cutting of round bar stock to a change in speed along an arc at a rate that also changes the transverse component of the cutting torch speed.

This application is a division of my copending application, Serial No. 315,473, filed January 25, 1940.

Other objects, features and advantages of the invention will appear or be pointed out as the specification proceeds.

In the accompanying drawing, forming a part hereof:

Figs. 1–6 are diagrammatic views showing successive positions of cutting torches and the progress of the cuts when severing a round-stock work-piece in accordance with this invention.

Two oxygen cutting torches 11 and 12 are used to cut a metal work-piece 13 which is shown as a round bar or billet, but which may be of various shapes. Some features of the invention, however, relate particularly to the cutting of cylindrical work-pieces.

The torches 11 and 12 may be of conventional design with a central oxygen jet surrounded by oxy-fuel gas preheating jets that heat the surface metal to ignition temperature as the torch progresses over the work-piece during a cutting operation. The torches may be moved by apparatus such as shown in my copending application Serial No. 315,473, or may even be moved by hand.

Fig. 1 shows the torches 11 and 12 in starting position. The torch 12 is preferably vertical and the torch 11 set at an angle so that its oxygen jet slopes at a small angle toward the vertical jet from the torch 12. The purpose and amount of this slope will be explained as the description proceeds.

The torches 11 and 12 are held in starting position, after their preheating flames are lit, until the metal under the torches is heated to ignition temperature. Both torches may be started on their cutting strokes at the same time, but in the preferred embodiment of the invention the right-hand torch 12 is started a short while ahead of the left-hand torch 11.

Figure 2:
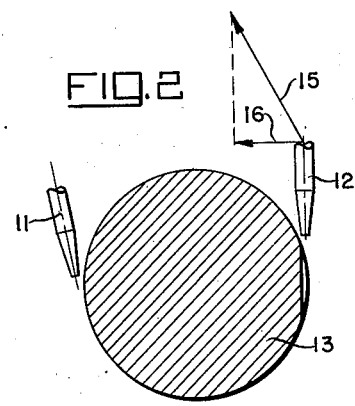

Fig. 2 shows the torch 12 moving parallel to itself, and about the axis of the work-piece 13 as a center, as it starts cutting the work-piece from the right side. The torch 12 is moved on an arc that keeps the tip of the torch substantially uniformly spaced from the surface of the work-piece. The direction and speed of movement at the instant represented by Fig. 2 are indicated by a vector 15. The horizontal component of the movement of the cutting jet of torch 12 is represented by the vector 16. In the preferred embodiment of the invention the torch 12 is always moved parallel to itself and the cutting jet from this torch remains vertical.

After the torch 12 has been moved a short distance, for example, about 6°, the torch 11 is moved parallel to itself along an arc in the same manner as the torch 12.

Figure 3:
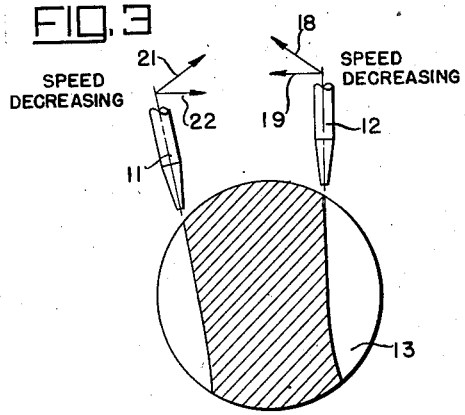

Fig. 3 shows the positions of the torches and the progress of the cuts at the time that the right-hand torch 12 has been moved 45°. The direction and speed of movement are indicated by a vector 18 and the horizontal component of this movement by a vector 19.

The speed represented by the vector 18, that is, the speed along the arc of movement of the torch 12, is enough less than the arc speed (vector 15) of Fig. 2 to make the horizontal component (vector 19) of movement in Fig. 3 less than the horizontal component (vector 16) of Fig. 2. The reduction in horizontal speed is enough to compensate for the increased thickness of the work-piece as the torch 12 progresses toward the left.

This decrease in the rate of horizontal displacement of the cutting jet from torch 12 is progressive from the time the torch accelerates to a selected cutting speed at the beginning of the cutting operation, until the torch reaches a position over the center of the work-piece.

In similar manner, the torch 11, after a starting acceleration to a selected cutting speed, gradually slows down as it moves toward the right. The speed along its arc of actual movement is indicated in Fig. 3 by a vector 21 and the horizontal component of this movement by a vector 22.

Figure 4:
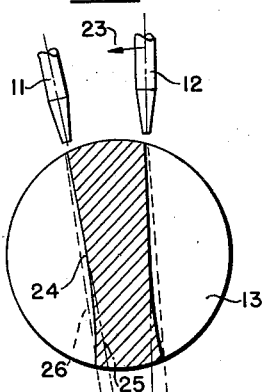

Fig. 4 shows the cutting torch 11 at the end of its cutting stroke. The torch 11 is shown stopped and the oxygen cutting jet is shut off. The movement of the torch 12 continues as indicated by a vector 23. The torches 11 and 12 might be made to approach closer together before one of them is stopped preparatory to moving it out of the way of the other torch. It is advantageous to have both torches cutting simultaneously as long as possible in order to shorten the time required to sever a given work-piece. However, the physical dimensions of the torches or of the means by which the torches are supported and moved, limit the distance within which one torch can be brought toward the other. The stopping position of the torch 11 is that of the apparatus disclosed in my copending application Serial No. 315,473.

The face of the cut, that is, the front wall of the kerf cut by the torch 11 is indicated by the line 24. This line is not straight because of the "drag" of the cut when working in a heavy section. The direction in which the cutting jet is projected from the torch 11 is indicated by the dot-and-dash center line 25. A dotted line 26 connects the top and bottom edges of the face of the cut. The angle A between the lines 25 and 26 is the angle of drag of the cut made by the torch 11. The angle B is the angle of drag of the cut made by torch 12.

Because of drag, the faces of the cuts made by both torches would be closest together at the tops of the cuts if the jets from the torches 11 and 12 were originally parallel. By disposing the torch 11 at an angle to the direction of the jet from torch 12, and making this angle equal to or greater than the sum of the drag angles of the two cuts, the faces of the cuts can be brought closer together near the bottoms of the kerfs. The advantage of this is that after the jet from the torch 12 has continued to move until it intersects the face 24 at its lower end, the torch 12 can continue cutting until the work-piece is severed. If the top of the cut were completed first, however, further cutting would not continue satisfactorily at a distance from the torch and its preheating jets.

Figure 5:
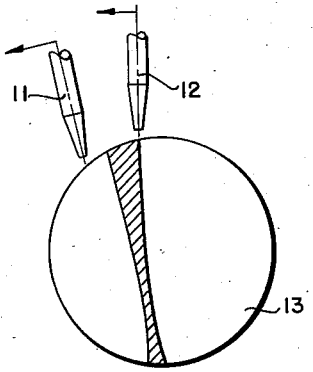

Fig. 5 shows the torch 11 moving back toward its starting position and out of the way of the torch 12 that continues to move toward the left to complete the cut. This figure shows clearly the way in which the cuts come together at the bottoms of the kerfs first.

Figure 6:
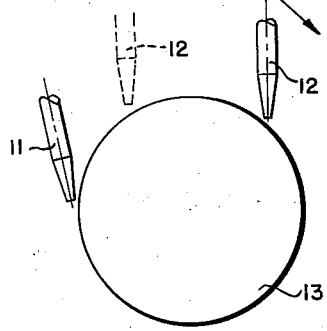

Fig. 6 shows the torch 11 at rest back in its starting position. The torch 12 is shown moving back to starting position. The extreme left-hand position that was reached by the torch 12 is shown in dotted lines. During this time that the torch 12 is being returned to starting position, the work-piece 13 can be moved forward into position to have the torches 11 and 12 repeat their cutting operations and sever a new length from the work-piece.

Either one of the torches may be sloped for undercutting drag, or both of them may slope. In work that is thin in proportion to the size and velocity of the oxygen jets, where the drag is negligible, the streams from both torches can be parallel. Terms of orientation in the description and claims are relative. Some features of the invention can be used without others, and various changes and modifications can be made in the illustrated embodiment without departing from the invention as defined in the claims.

I claim:

1. The method of cutting transversely through metal bar stock or other metal work-pieces of cylindrical shape, which method comprises directing a substantially vertical oxygen jet from a torch and against surface metal that has been heated to ignition temperature and moving the torch parallel to itself and about the axis of the work-piece on a radius that maintains the torch at a substantially uniform distance from the surface to be cut, moving the torch to cut along a right plane and reducing the speed of movement along the arc at a rate that reduces the horizontal component of the torch movement to compensate for changes in the thickness of the work-piece as the jet cuts nearer to the center where the work-piece is of maximum diameter, simultaneously cutting from the opposite side of the work-piece and along the same right plane by an oxygen jet directed from a torch at an angle toward the vertical jet from the first torch, said angle being approximately equal to the sum of the drag angles of both cuts near the inner ends of said cuts, stopping the second oxygen jet and reversing the direction of movement of the second torch before the torches come together, and continuing the cutting operation of the first torch until its cut intersects that of the second torch and completely severs the work-piece.

2. The method of cutting comprising simultaneously moving oxygen cutting jets across a metal work-piece from opposite sides with the surface metal against which the jets are directed at ignition temperature and with the jets disposed to cut in a common plane, and directing the jets in converging directions so that the cuts meet first at the bottom of the kerfs in spite of the drag of the cutting operations of both jets.

3. The cutting process comprising moving oxygen jets across a metal work-piece from opposite ends of a desired line of cut and with the jets directed to cut in a common plane, and directing one jet at an angle to the other to undercut the drag of the cut made by the other jet.

4. The method of cutting a metal work-piece which comprises moving oxygen cutting torches across the work-piece from opposite sides with the torches positioned to cut in a common plane, and directing the oxygen jet from one torch at an angle to the direction of the jet from the other torch, which angle is at least equal to the sum of the angles of drag of the cuts made by said torches.

JAMES L. ANDERSON.